US012794905B2

(12) United States Patent
Barbu et al.

(10) Patent No.: US 12,794,905 B2
(45) Date of Patent: Nov. 10, 2026

(54) ATTACKER DETECTION IN AMBIENT IOT

(71) Applicant: Nokia Technologies Oy, Espoo (FI)

(72) Inventors: Oana-Elena Barbu, Aalborg (DK); Paolo Baracca, Munich (DE); Benny Vejlgaard, Aalborg (DK)

(73) Assignee: Nokia Technologies Oy, Espoo (FI)

(*) Notice: Subject to any disclaimer, the term of this patent is extended or adjusted under 35 U.S.C. 154(b) by 243 days.

(21) Appl. No.: 18/592,733

(22) Filed: Mar. 1, 2024

(65) Prior Publication Data

US 2024/0305652 A1 Sep. 12, 2024

(30) Foreign Application Priority Data

Mar. 10, 2023 (GB) ...................................... 2303502

(51) Int. Cl.
*H04L 9/40* (2022.01)
*G16Y 30/10* (2020.01)

(52) U.S. Cl.
CPC .......... *H04L 63/1416* (2013.01); *G16Y 30/10* (2020.01)

(58) Field of Classification Search
CPC ... H04W 12/121; H04W 4/80; H04W 12/122; H04L 63/1416; G16Y 30/10; H04K 3/22; H04K 3/45; H04K 3/65; H04K 3/86; H04K 2203/20
See application file for complete search history.

(56) References Cited

U.S. PATENT DOCUMENTS 11,159,944 B2 10/2021 Tran et al.
11,218,880 B2 1/2022 Ohlsson et al.
2010/0302373 A1* 12/2010 Monsive, Jr. ........ G08B 15/001 348/151
2013/0106576 A1 5/2013 Hinman et al.
2019/0199756 A1* 6/2019 Correnti ........... G08B 13/19613
2021/0360530 A1* 11/2021 Shahidi .................... H04W 8/20
2022/0201489 A1 6/2022 Mahalank et al.
2023/0057179 A1* 2/2023 Kim ........................ G01S 19/21

FOREIGN PATENT DOCUMENTS

WO WO-2021258382 A1 * 12/2021 ............... H04K 3/22
WO 2022/192821 A1 9/2022
WO 2022/271275 A1 12/2022

OTHER PUBLICATIONS

PCT Application No. PCT/EP2023/056120, "Attacker Detection in Ambient IOT", filed on Mar. 10, 2023, pp. 1-43.

(Continued)

*Primary Examiner* — Daniel B Potratz
*Assistant Examiner* — Matthias Habtegeorgis
(74) *Attorney, Agent, or Firm* — Harness, Dickey & Pierce, P.L.C.

(57) ABSTRACT

Example embodiments of the present disclosure relate to attacker detection in ambient IoT. An apparatus receives at least one signal which is at least associated with a trick tag signal transmitted from a terminal device. The apparatus determines a number of attackers of a tag detection session based on the at least one signal. The apparatus transmits, to a network device, attacker information at least comprising the number of attackers. In this way, the NR element is enabled to identify and report jamming activities to the network in time. Therefore, the tag detection integrity can be guaranteed.

21 Claims, 7 Drawing Sheets

(56) References Cited

OTHER PUBLICATIONS

"New SID: Study on x-IoT", 3GPP TSG RAN#97e, RP-222453, Agenda: 9.1.1, Huawei, Sep. 12-16, 2022, 4 pages.
Finland Application No. 20205440, "Radio Jamming Detection", filed on Apr. 29, 2020, pp. 1-40.
PCT Application No. PCT/CN2020/098301, "Reactive Jamming Detection", filed on Jun. 25, 2020, pp. 1-28.
Cheng et al., "An Algorithm for Jammer Localization in Wireless Sensor Networks", IEEE 26th International Conference on Advanced Information Networking and Applications, Mar. 26-29, 2012, 8 pages.
"Msc-generator", Sourceforge, Retrieved on Mar. 15, 2024, Webpage available at :https://sourceforge.net/projects/msc-generator/.
"3rd Generation Partnership Project; Technical Specification Group Radio Access Network; NR; Physical channels and modulation (Release 17)", 3GPP TS 38.211, V17.3.0, Sep. 2022, pp. 1-136.
"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.
"3rd Generation Partnership Project; Technical Specification Group Radio Access Network; NR; Physical layer procedures for data (Release 17)", 3GPP TS 38.214, V17.3.0, Sep. 2022, pp. 1-232.
"3rd Generation Partnership Project; Technical Specification Group Radio Access Network; NR; Physical layer procedures for control (Release 17)", 3GPP TS 38.213, V17.3.0, Sep. 2022, pp. 1-260.
"IEEE 802.11", Wikipedia, Retrieved on Mar. 15, 2024, Webpage available at : https://en.wikipedia.org/wiki/IEEE_802.11.
Search Report received for corresponding United Kingdom Patent Application No. 2303502.5, dated Sep. 19, 2023, 2 pages.
Extended European Search Report received for corresponding European Patent Application No. 24161130.0, dated Apr. 29, 2024, 8 pages.

* cited by examiner

ATTACKER DETECTION IN AMBIENT IOT

RELATED APPLICATION

This application claims priority to the United Kingdom Application No. 2303502.5 filed on Mar. 10, 2023, the content of which is incorporated herein by reference in its entirety.

FIELDS

Various example embodiments of the present disclosure generally relate to the field of telecommunication and in particular, to methods, devices, apparatuses and computer readable storage media for attacker detection in ambient Internet of Things (IoT).

BACKGROUND

In 5G NR, IoT technology has evolved to be suitable for cellular deployment. Such IoT technology may rely on ultra-low complexity devices with ultra-low power consumption for the very-low end IoT applications. In terms of energy storage, two types of IoT devices are considered, that is, pure batteryless devices and devices with energy storage capability. In particular, the batteryless devices are with no energy storage capability, and completely dependent on the availability of the ambient source of energy it is harvesting. The devices with energy storage capability are supplied by ambient sources via energy harvesting, and thus may not need to be replaced or recharged manually and can manage a short period of ambient energy unavailability.

Those IoT devices are to be detected via a tag detection session. However, in the cellular-based deployment, there may be fraudulent devices intended to block or jam passive tag signals from reaching a tag reader. For example, the fraudulent devices may disturb the tag detection session by proactively or reactively emitting malicious or jamming signals, so that the NR network is prevented from acquiring tag information, and ultimately compromising the detection integrity.

SUMMARY

In a first aspect of the present disclosure, there is provided an apparatus. The apparatus comprises at least one processor; and at least one memory storing instructions that, when executed by the at least one processor, cause the apparatus at least to perform: receive at least one signal which is at least associated with a trick tag signal transmitted from a terminal device; determine a number of attackers of a tag detection session based on the at least one signal; and transmit, to a network device, attacker information at least comprising the number of attackers.

In a second aspect of the present disclosure, there is provided an apparatus. The apparatus comprises at least one processor; and at least one memory storing instructions that, when executed by the at least one processor, cause the apparatus at least to perform: receive, from a device, attacker information at least comprising a number of attackers of a tag detection session, wherein the number of attackers is determined based on at least one signal received at the device, and the at least one signal is at least associated with a trick tag signal transmitted from a terminal device.

In a third aspect of the present disclosure, there is provided a method. The method comprises: receiving at least one signal which is at least associated with a trick tag signal transmitted from a terminal device; determining a number of attackers of a tag detection session based on the at least one signal; and transmitting, to a network device, attacker information at least comprising the number of attackers.

In a fourth aspect of the present disclosure, there is provided a method. The method comprises: receiving, from a device, attacker information at least comprising a number of attackers of a tag detection session, wherein the number of attackers is determined based on at least one signal received at the device, and the at least one signal is at least associated with a trick tag signal transmitted from a terminal device.

In a fifth aspect of the present disclosure, there is provided an apparatus. The apparatus comprises means for receiving at least one signal which is at least associated with a trick tag signal transmitted from a terminal device; means for determining a number of attackers of a tag detection session based on the at least one signal; and means for transmitting, to a network device, attacker information at least comprising the number of attackers.

In a sixth aspect of the present disclosure, there is provided an apparatus. The apparatus comprises means for receiving, from a device, attacker information at least comprising a number of attackers of a tag detection session, wherein the number of attackers is determined based on at least one signal received at the device, and the at least one signal is at least associated with a trick tag signal transmitted from a terminal device.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
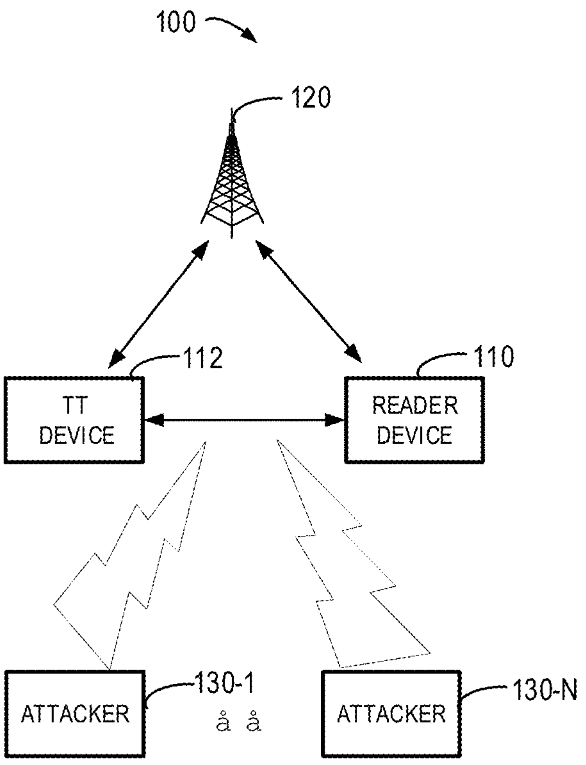
FIG. 1 illustrates an example communication environment in which example embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "fraudulent device", "tag jammer", or "attacker" may refer to a device that emit jamming signals to disturb a tag reading session. The tag jammer may be either proactive or reactive. The proactive jammer emits the jamming signals regardless of whether any tags are active or even present in a coverage area of the tag jammer. The reactive jammer monitors bands, and listens for tag activities, e.g., either activation signals, or tag replies. As soon as such activities are detected in any of the monitored bands, the reactive jammer may start jamming the associated spectrum.

As compared with the reactive jammers, the proactive jammers are less efficient and more easily detected. On the other hand, the reactive jammers are more aggressive, since they can concentrate their jamming powers in the resources that matter. Those tag jammers would severely threaten the integrity of tag detection in NR network.

If the NR network is able to detect the tag jammers in time, and accurately determine the number of the jammers, it is possible to locate those attackers and ensure the integrity of tag detection accordingly. However, detecting jamming attacks is a challenging task mainly because it involves distinguishing malicious behaviors from legitimate bad link conditions (e.g., caused by interference, fading, impulsive noise, hidden node, etc.) that cause poor performance.

According to the example embodiments of the present disclosure, there is provided a solution of attacker detection for ambient IoTs. In this solution, one NR network element (e.g., a UE) may act as a trick tag (TT) that emulates a tag to stimulate the attackers in the deployment. Another NR network element (e.g., a gNB or a UE) may act as a tag reader that observes a spectrum associated with the TT transmission and assesses whether the spectrum becomes polluted by additional signals, after the TT transmission has started. In this way, the tag reader can then profile the attackers of ambient IoTs. Such profiles may help the NR network against the attackers.

FIG. 1 illustrates an example communication environment 100 in which example embodiments of the present disclosure can be implemented. The communication environment 100 may be a communication network that supports IoT applications. The communication environment 100 may comprise a reader device 110, a TT device 112, and a network device 120. The reader device 110, the TT device 112, and the network device 120 may communicate with each other. It should be understood that in the communication environment 100, there may also be one or more tags and tag readers (not shown).

The reader device 110 may be either a terminal device (e.g., UE) or a network device (e.g., a gNB) that acts as a tag reader. The TT device 112 may be a terminal device (e.g., UE) that acts as a trick tag. In particular, the TT device 112 may mimic a tag to stimulate one or more attackers to react, so that the network device 120 can identify the malicious activity.

In some example embodiments, the TT device 112 may not wait for an activation signal, but transmit a tag signal as configured. This is done to avoid activating other random tags from also transmitting and thus hampering the attacker detection. Accordingly, the reader device 110 may monitor a spectrum for activation signal transmission and assesses whether the spectrum is polluted by additional signals.

Moreover, as shown in FIG. 1, there may be one or more attackers 130-1 to 130-N (collectively referred to as attacker 130 hereinafter) that attempt to disturb a tag detection/reading session in the communication environment 100. For example, the attacker 130 may emit a jamming signal intended to block or jam a spectrum on which tag signals are to be transmitted.

It should be understood that although multiple attackers are shown in FIG. 1, the embodiments of the present disclosure are also applicable to the case where only one attacker is present, i.e., N is an integer greater than or equal to 1. Therefore, the present disclosure is not limited in this regard.

In order to ensure the integrity of tag detection session, the network device 120 may be interested in the number of the attackers. For example, the network device 120 may be able to locate or at least determine a direction of the attack 130 relative to a network element in the communication network 100 based on the number of the attackers. In some example embodiments, the number of the attackers may be determined from at least a part of attacker detection procedure between the reader device 110 and the TT device 112, which will be described in detail below.

In the following, for the purpose of illustration, some example embodiments are described with the reader device 110 operating as a terminal device, and the TT device 112 operating as a network device. However, in some example embodiments, operations described in connection with a terminal device may be implemented at a network device or other device, and operations described in connection with a network device may be implemented at a terminal device or other device.

In some example embodiments, if the reader device 110 is a terminal device, a link from the network device 120 to the reader device 110 is referred to as a downlink (DL), while a link from the reader device 110 to the network device 120 is referred to as an uplink (UL). In DL, the network device 120 is a transmitting (TX) device (or a transmitter) and the reader device 110 is a receiving (RX) device (or a receiver). In UL, the reader device 110 is a TX device (or a transmitter) and the network device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Example embodiments of the present disclosure will be described in detail below with reference to the accompanying drawings.

Figure 2:
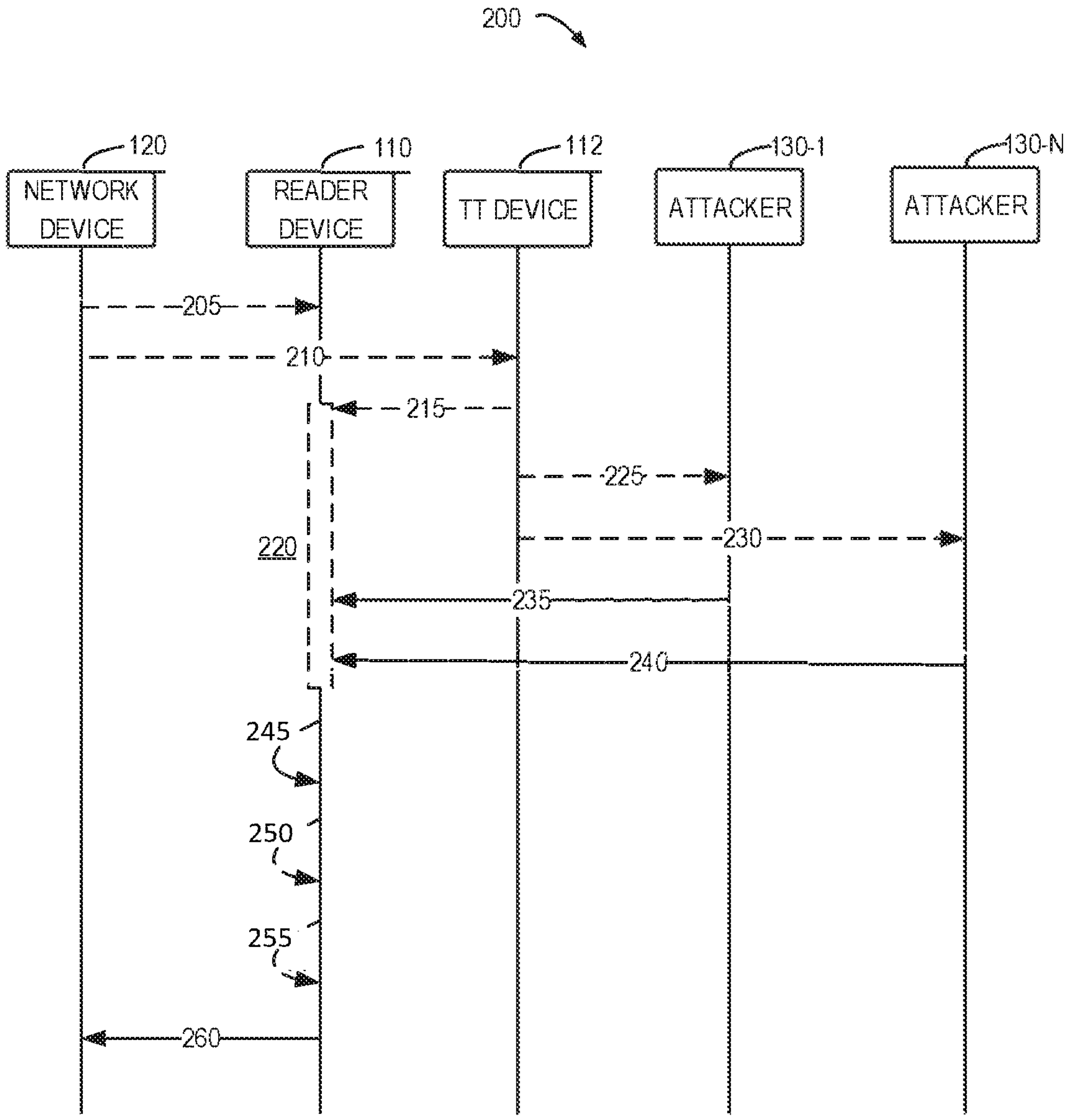
FIG. 2 illustrates a signaling chart for communication according to some example embodiments of the present disclosure.

Reference is now made to FIG. 2, which illustrates a signaling chart of an attacker detection process 200 according to some example embodiments of the present disclosure. For the purpose of discussion, reference is also made to FIG. 1 to describe the attacker detection process 200.

The attacker detection process 200 may be implemented between the reader device 110, the TT device 112, and the network device 120. In particular, the TT device 112 may transmit a TT signal, which is referred to as an initialization signal. Such a TT signal may stimulate the attacker 130 react, for example, transmitting at least one signal in response to the TT signal. On the other hand, the reader device 110 may monitor a spectrum associated with the TT signal transmission, and profile if any signal from the attacker 130 is present. It should be understood that the attacker detection process 200 is applicable to both a case that a single attacker (e.g., attacker 130-1) is present and a case that multiple attackers (e.g., attackers 130-1 to 130-N) are present.

To facilitate the attacker detection process 200, the network device 120 may configure 205 the reader device 110 with a TT signal configuration. The network device 110 may also configure 210 the TT device 112 with the same or analogous TT signal configuration. The network device 120 may either simultaneously or sequentially transmit the TT signal configuration to the reader device 110 and the TT device 112.

In some example embodiments, the attacker detection process 200 may be triggered by the transmission of the TT signal configuration. The TT signal configuration may be transmitted over a secure link with the TT device 112 to prevent from being predicted by the attacker 130.

In addition, a location of the TT device 112 relative to the reader device 110 may be predetermined or estimated prior to starting the attacker detection procedure. For example, if the TT device 112 and the reader device 110 are NR UEs in RRC_CONNECTED mode, their relative locations may be derived by the network device 120 by using channel state information (CSI) obtained from primary synchronization signal (PSS), secondary synchronization signal (SSS), channel state information reference signal (CSI-RS), downlink positioning reference signal (DL PRS), uplink sounding reference signal (UL SRS), etc. Alternatively, the TT device 112 may be triggered to perform sidelink (SL) positioning with the reader device 110, that is, the TT device 112 is configured to transmit SL PRS that allow the reader device 110 to estimate the location of the TT device 112 and/or channel related parameters, e.g., propagation delay and path-loss. With the location information of the TT device 112, the reader device 110 is enabled to capture the total TT signal and not only later reflections.

The TT signal configuration may indicate at least the following parameters:

- a first quiet period $T_{P1}$, which may be regarded as an offset, and which, in some example embodiments, may have a duration of t1 (for example, ranges from 0 to a time point t1),
- an active period $T_A$ during which the TT signal is to be transmitted in band B, carrier fc, and with power P, and which may have a duration of T, and
- a second quiet period $T_{P2}$ with zero power, which may have a duration of t2.

Based on the TT signal configuration, the TT device 112 may transmit the TT signal only in the active period $T_A$, and mute in the first and second quiet periods $T_{P1}$ and $T_{P2}$, thus the TX power is zero.

The TT signal configuration for the reader device 110 may also indicate an observation window (denoted by W) that starts at Tstart and ends at Tstop, i.e., W=[Tstart, Tstop]. Tstart ensures that the reader device 110 can start listening at the right time so that the entire TT signal is made available for analysis. In view of this, Tstart may be proportional to a distance between the TT device 112 and the reader device 110.

The observation window comprises at least the first quiet period $T_{P1}$, the active period of $T_A$, and the second quiet period of $T_{P2}$. In other words, the observation window W lasts for at least Tt=t1+T+t2 (e.g., in seconds).

The above configuration is given as one of various implementations of the TT signal. In some other example embodiments, it is possible to implement different variations of the TT signal, for instance without forcing the same TX power (e.g., the power P) for the whole active period T. As an example, the active period T may be divided in two halves, in the first T/2, the TT device 110 may transmit with power P1, while in the second T/2 with power P2.

Other functions or variations can be implemented as well. This may be beneficial to the attacker detection, as more complex "power modulation" functions are more difficult to be predicted by the attacker(s).

The TT device 112 may then transmit TT signals based on the TT signal configuration. In some example embodiments, the TT signal, denoted by s(t), is determined as below:

$$s(t) = \begin{cases} 0, t \in [0, t1) \\ b(t) \neq 0, t \in [t1, t1+T] \\ 0, t \in (t1+T, t1+T+t2] \end{cases} \quad (1)$$

where the first quiet period $T_{P1}$ ranges from 0 to t1, the active period $T_A$ ranges from t1 to t1+T, and the second quiet period $T_{P2}$ ranges from t1+T to t1+T+t2. In the above example, the first quiet period $T_{P1}$ starting from 0 is given as a default setting, which refers to the start time in relation to a known clock reference. It should be understood that the first quiet period may start from any appropriate time point preceding t1 in other example embodiments of the present disclosure. The transmitted (TX) powers of s(t) in the first quiet period $T_{P1}$ and the second quiet period $T_{P2}$ are constant and negligible, and the TX power b(t) in the active period $T_A$ is non-zero.

The TT signal may travel 215 to the reader device 110 over a channel with impulse response h(t), which is determined as below:

$$h(t) = h_0\delta(t-\tau_0) + \sum_{l=1}^{L-1} h_l\delta(t-\tau_l) \quad (2)$$

where $h_0$ represents a channel gain of the first propagation path, and $\tau_0$ represents its delay. Since the location of the TT device 112 relative to the reader device 110 has been computed by the network device 120, the delay $\tau_0$ is known. The second term of the equation (2) sums all other reflections.

In some example embodiments, since the attacker 130 may be reactive, their attacks may be expected at the reader device 110 after the first reception of the TT signal. In this case, the reader device 110 may monitor 220 the spectrum (e.g., spectral resources) associated with the TT signal during the observation window W.

In some example embodiments, the reader device 110 may measure the received power profile (RPP) for each of the intervals, i.e., the first quiet period $T_{P1}$, the active period $T_A$, and the second quiet period $T_{P2}$. Depending on whether the attack 130 is present, different RPPs may be obtained by the reader device 110.

If no attacker is present, the RX signal should be dominated by the TT signal without jamming signals. In this case, the RPP during the active period T may be constant and non-negligible, for example, above a first threshold. In addition, the RPP during the first quiet period $T_{P1}$ and the second quiet period $T_{P2}$ may be negligible, e.g., below a second threshold (e.g., Pn≥0).

Figure 3A:
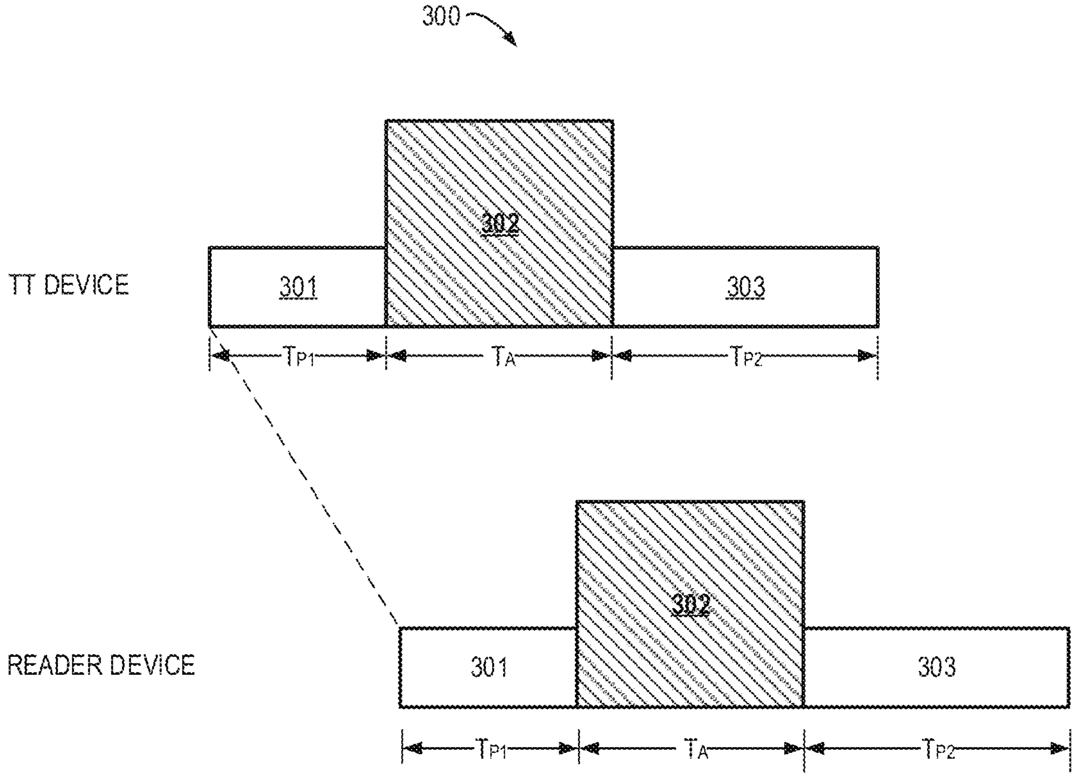
FIG. 3A illustrates a schematic diagram of an example RPP according to some example embodiments of the present disclosure.

FIG. 3A illustrates a schematic diagram of an example RPP 300 according to some example embodiments of the present disclosure. As shown in FIG. 3A, there is a propagation delay between the transmission of TT signal at the TT device 112 and the reception of the TT signal at the reader device 110. Moreover, the RPP 300 obtained by the reader device 110 comprises respective power profile parts 301 to 303 in the first quiet period $T_{P1}$, the active period $T_A$ and the second quiet period $T_{P2}$. In particular, the power profile part 302 in the active period $T_A$ is substantially flat and non-negligible (e.g., above the first threshold), while the power profile parts 301 and 303 in the first and second quiet periods $T_{P1}$ and $T_{P2}$ are negligible (e.g., below the second threshold).

On the other hand, if at least one attacker 130 is present in the communication network 100, the TT signal may be also heard by the attacker 130. Referring back to FIG. 2, the attacker 130-1 and the attacker 130-N may receive 225, 230 the TT signals. In response, the attacker 130-1 and the attacker 130-N may start generating signals associated with the TT signal, which is also referred to as attack signals, denoted by $a_x$ (t), where x=1:X.

Accordingly, the attackers 130-1 to 130-N may transmit 235, 240 the attack signals. These attack signals may also reach the reader device 110 via respective channels. In particular, each of the attack signals may travel via a channel $h_x(t)$, which is determined as below.

$$h_x(t) = h_{x0}\delta(t-\tau_{x0}) + \sum_{l=1}^{L_x-1} h_{xl}\delta(t-\tau_{xl}) \quad (3)$$

As previously mentioned, the attack signals may be expected at the reader device 110 after the first reception of the TT signal, i.e., $\tau_{x0} >> \tau_0$, ∀x=1:X. Therefore, in case that the attacker 130 is present, during the observation window W, the reader device 110 may observe a RX signal y(t) as below:

$$y(t) = (s*h)(t) + \sum_{x=1:X} (a_x * h_x)(t) \quad (4)$$

where the operator (*) denotes convolution.

In this case, the RPP during the active period T may exhibit a step behavior. This is because the attackers 130-1 to 130-N act unsynchronized (i.e., with respect to the TT device 112), and have different locations. Therefore, their attacks will be observed at different moments in time as seen by the reader device 110.

Figure 3B:
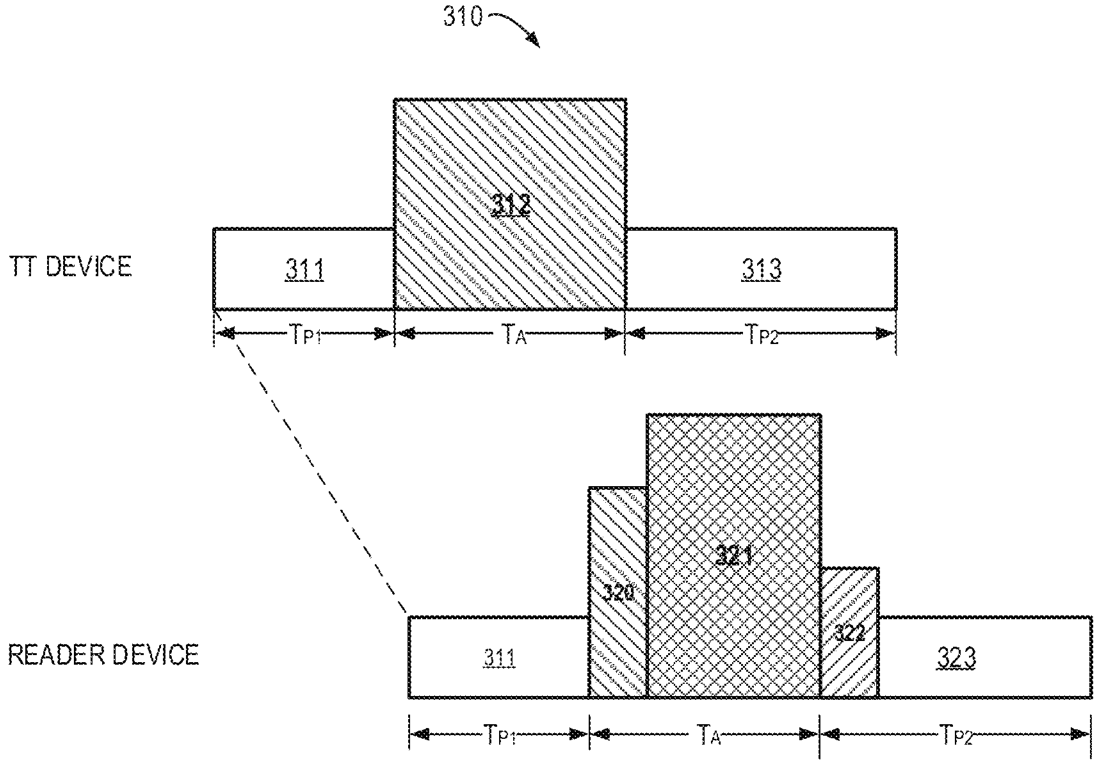
FIG. 3B illustrates a schematic diagram of another example RPP according to some example embodiments of the present disclosure.

FIG. 3B illustrates a schematic diagram of another example RPP 310 according to some example embodiments of the present disclosure. There is also a propagation delay in the example of FIG. 3B. As shown in FIG. 3B, the RPP 310 comprises the power profile part 311 in the first quiet period $T_{P1}$. For example, since no TT signal is received in the first quiet period $T_{P1}$, the power profile part 311 is constant and below the second threshold. There is a step in the power profile part in the active period $T_A$. In other words, the power profile part in the active period $T_A$ comprises more than one power level. In the example shown in FIG. 3B, the power level 320 may correspond to the TT signal, and the power level 321 may correspond to an addition of the TT signal with the attack signal from the attacker 130. In addition, there is also a step in the power profile part in the second quiet period $T_{P2}$. In particular, the power level 322 may correspond to the attack signal from the attacker 130. As neither TT signal nor the attack signal is received, the power level 323 may be constant and below the second threshold.

Accordingly, the reader device 110 determines 245 a number of attackers 130-1 to 130-N of the tag detection session based on the attack signal. In some example embodiments, if the power profile part in the active period $T_A$ is substantially flat and non-negligible (e.g., above the first threshold), and the power profile parts in the first and second quiet periods $T_{P1}$ and $T_{P1}$ non-negligible (e.g., below the second threshold), as shown in FIG. 3A, the reader device 110 may determine 250 the number of the attacker 130 to be zero.

Otherwise, if there is a step behavior in the power profile part in the active period T, the reader device 110 may increment 255 the number of the attackers 130 in a counter which may be integrated in the reader device or separate therefrom. In some example embodiments, when such step behavior is identified, the reader device 110 may be configured to log the number of steps for a subsequent reporting to the network device 120. The number of steps may be counted by using a counter that is expected to be proportional to the number of attackers 130.

In some example embodiments, the reader device 110 may determine the number of the attackers 130 based on the power profile. In particular, the reader device 110 may sample the RX signal every Ts, which is the sampling time of the system, and collect the samples in the vector, denoted by y, as below:

$$y = \left[y(T\text{ start}),\, y(T\text{ start} + Ts),\, \ldots,\, y\left(T\text{ start} + \left\lceil \frac{T\text{ stop} - T\text{ start}}{Ts} \right\rceil Ts\right)\right] \tag{5}$$

Using the collected samples, the reader device 110 may apply the following method which comprises the following main steps.

A. Binning the RX Samples

The power profile of the active period $T_A$ may comprise power levels in a plurality of bins of the active period $T_A$. First, the reader device 110 may split the vector y into B vectors or bins as below:

$$y^{[1]} = [y(l), \ldots, y(K)],\ K = \left\lfloor \frac{\tau_0 + t1 + dt}{Ts} \right\rfloor,\ l = \left\lfloor \frac{t1}{Ts} \right\rfloor \tag{6}$$

$$y^{[2]} \ldots,$$

$$y^{[B]}.$$

where dt is the shortest time to attack i.e., the time that an attacker would take to detect the TT signal, switch to transmission, and generate and transmit the attack signal, e.g., approximately 1 microsecond. Note that, a gap period standardized in TS 38.211 to allow the TX-RX switch is around 13 microseconds.

Thus, bin b=1 is expected to be a reference bin, i.e., a bin dominated by the TT signal. Before the B bins, there may also have a bin with index 0, i.e., b=0, expected to receive the first quiet period $T_{P1}$. With bin 0, it may be convenient to detect simpler non-reactive jammers.

B. Profiling Per Bin

After binning the samples, for each bin b, where b=1:B, the reader device 110 may compute a vector of RPP, denoted by RPP(b), and a vector of channel profile (CP), denoted by CP(b), as below $$RPP(b) = |y^{[b]}|^2 \tag{7}$$

$$CP(b) = |y^{[b]} \star s|^2 \tag{8}$$

where * denotes cross-correlation, and |•|2 applies the squared absolute value to each entry of the vector y to which it is applied. Note that operation (8) describes a standard envelope detection in which the CP is isolated from the TX signal.

The reference bin b=1 is expected to contain the sole TT signal, therefore the operation (8) will return the approximate channel delay profile for the TT-reader channel i.e., the useful channel. The remaining bins contain in addition to the TT signal, the attacker signals, therefore the operation (8) will return a noisy TT-reader channel, where the noise level depends on the power and number of attackers 130. In the worst-case scenario, the useful channel may be completely drowned in noise, and operation (8) will return only the noise power profile.

C. Analyzing Profiles Across Bins

Next, the reader device 110 may check if the RPP is negligible during the first and second quiet periods $T_{P1}$ and $T_{P2}$, and if the RPP exhibits a step behavior across bins corresponding to the active period $T_A$, that is, if the RPP exhibits a step or a jump larger than a selected threshold between any two consecutive samples. For example, the jump may be positive or negative.

If a jump is detected between two consecutive samples, then the reader device 110 may increment an attacker counter c, e.g., c=c+1. Moreover, the reader device 110 may store a size of the jump. For example, the reader device 110 may compute a difference between the RPPs for the samples corresponding to the jump dp. In the context of the present disclosure, the size of the jump may be also referred to as a size of a step. It is to be understood that a size is related to a value corresponding to a measured power profile difference in any consecutive two RPPs.

Additionally, or alternatively, the reader device 110 may analyze the CP. For example, the reader device 110 may count the number of relevant taps (i.e., entries in the vector CP(b) with a value being above a threshold) in each bin, and compute a sparsity metric, for example, a bin sparsity metric S(b). The sparsity of a channel is a property of the channel impulse response when the channel is observed to exhibit a small number of multipath components.

The reader device 110 may compare the sparsity of each bin with index b>2 with that of the reference bin with index b=1. The reader device 110 may then determine the number of attackers 130 based on the sparsity metrics. For example, the reader device 110 may increment the counter c if both of the following conditions are met:

- an RPP jump is detected, and
- a bin with sparsity different than that of the reference bin is found.

Otherwise, if all of the sparsity metrics are the same as the sparsity metric of the reference bin, the reader device 110 may determine the number of attackers 130 to be zero.

Figure 4:
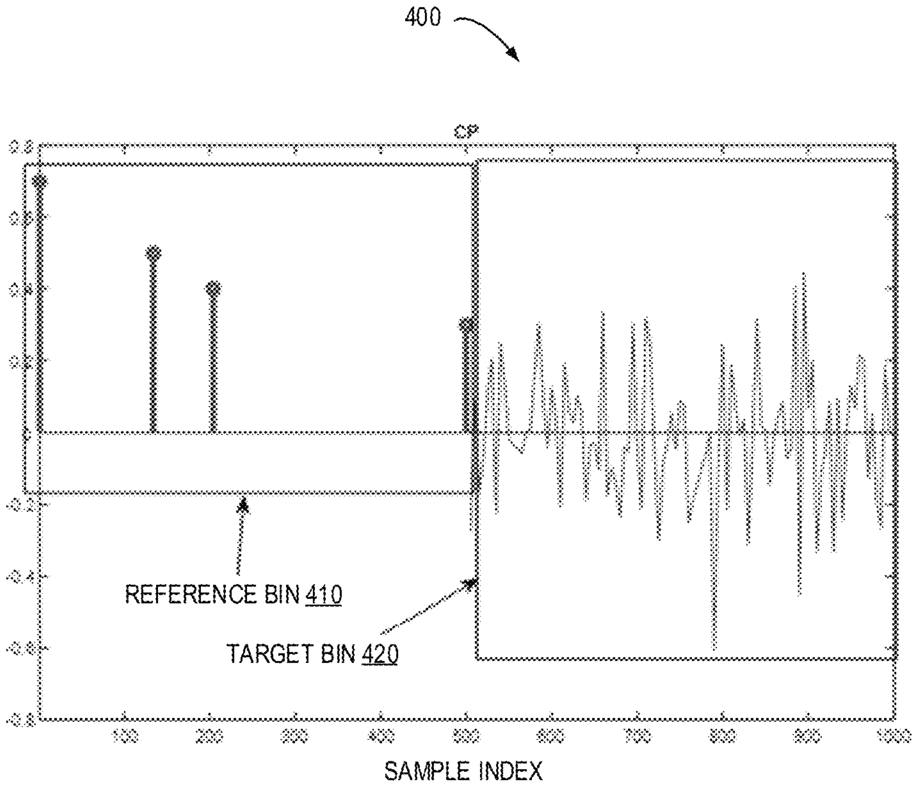
FIG. 4 illustrates a schematic diagram of a comparison of a channel profile (CP) in reference bin with a CP in a target bin contaminated by an attack according to some example embodiments of the present disclosure.

In the context of the present disclosure, the channel sparsity may refer to a property of a channel impulse response when said channel is observed to exhibit a small number of multipath components. FIG. 4 illustrates a schematic diagram of a comparison 400 of a CP in the reference bin 410 with a CP in a target bin 420 contaminated by an attack according to some example embodiments of the present disclosure. As shown in FIG. 4, the reference bin 410 and the target bin 420 have different sparsity.

The metrics in the above operation (8) expresses the CP in a certain bin (e.g., CP (b)) with a distribution of the channel energy on different paths in a "delay" domain. Alternatively, other metrics may be used for expressing CP(b). For example, if the reader device 110 is equipped with multiple antennas, CP(b) may be expressed with a distribution of the channel energy in a "spatial" domain, which tries to exploit different angles of arrivals (AoAs) of different paths.

As an example, if the reader device 110 is equipped with N antennas, for each bin b, it may estimate a channel between the TT device 112 and its n-th antenna as below:

$$h_n(b) = f\left(y^{[b,n]}, s\right) \tag{9}$$

where $y^{[b,n]}$ represents a RX signal on bin b by n-th antenna. In this case, now the reader device 110 receives N signals, one for each antenna. The function $f$ represents a channel estimation algorithm. Such a channel estimation algorithm can be implemented by using a de-correlator as in operation (8), but other methods can also be used.

Then, the reader device 110 may compute a channel frequency response $H_n(b)$ from the time domain representation $h_n(b)$ for each antenna n.

After that, for each bin b, the reader device 110 may estimate a covariance matrix R(b) (e.g., of size N×N), $$R(b) = [H_1(b); H_2(b); \ldots ; H_N(b)] \times [H_1(b); H_2(b); \ldots ; H_N(b)]^H \tag{10}$$

The reader device 110 may also calculate its eigen-vector decomposition as below:

$$R(b) = U(b)\Lambda(b)U(b)^H \tag{11}$$

where the eigenvectors in U(b) represent spatial directions from which the energy is received at the reader device 110.

Therefore, a potential expression for CP(b) can be expressed as below:

$$CP(b) = U(b)\Lambda(b)^{1/2} \tag{12}$$

where CP(b) is a matrix with each column representing a spatial direction from which some energy is received at the reader device 110.

Note that metric in operation (12) may be beneficial for example in a scenario where a lot of scatterers are around the reader device 110, so that the channel may be characterized by many paths, but all have a similar delay, i.e., they cannot be distinguished by using metric in operation (8), but can be separated because of their different AoA with a metric in operation (12).

It should be understood that the number of the attackers 130 may be determined based on the power profile of the attack signal alone, or based on a combination of the power profile and the channel profile of the attack signal. The present disclosure is not limited in this regard.

The reader device 110 then transmits 260 attacker information at least comprising the number of attackers 130-1 to 130-N to the network device 120. Additionally, in some example embodiments, the attacker information may further comprise a size of at least one step in the power profile part in the active period T. For example, the size of the at least one step may be a difference between a first power level of a first bin and a second power level of a second bin, where the first bin and the second bin are consecutive bins.

According to the example embodiments of the present disclosure, there is provided a solution of attacker detection in ambient IoTs. In this solution, the tag reader is able to identify the attacks that intend to block or jam tag sessions, and report attacker information to the NR network. This information helps the NR network to detect the attacks of ambient IoTs and take appropriate measures to ensure the integrity of the tag detection. Thus, network performances and communication reliability can be improved.

Figure 5:
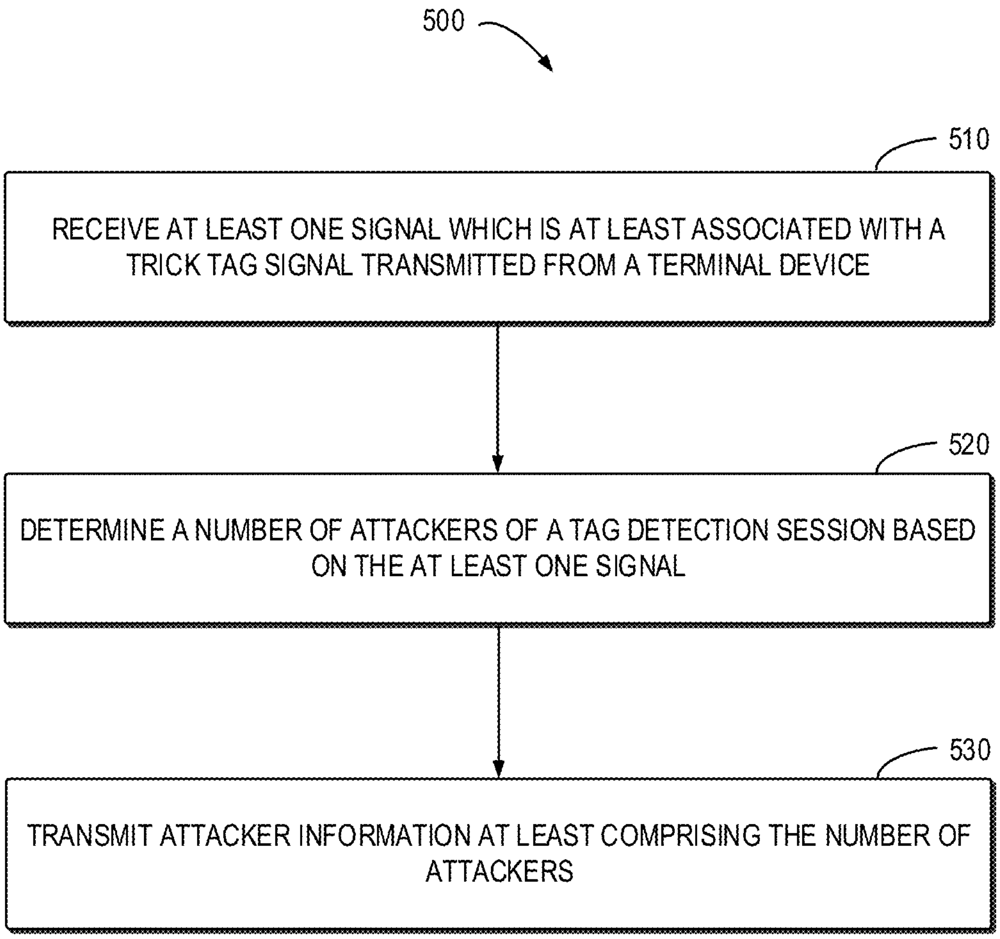
FIG. 5 illustrates a flowchart of a method implemented at an apparatus according to some example embodiments of the present disclosure.

FIG. 5 shows a flowchart of an example method 500 implemented at an apparatus in accordance with some example embodiments of the present disclosure. For example, the apparatus may be a tag reader, such as a gNB, a UE, etc. For the purpose of discussion, the method 500 will be described from the perspective of the reader device 110 in FIG. 1.

At block 510, the apparatus receives at least one signal which is at least associated with a trick tag signal transmitted from a terminal device.

In some example embodiments, the terminal device may act as the TT device 112 as shown in FIG. 1.

At block 520, the apparatus determines a number of attackers of a tag detection session based on the at least one signal.

At block 530, the apparatus transmits, to a network device, attacker information at least comprising the number of attackers. In some example embodiments, the network device may be a gNB, for example, the network device 130 as shown in FIG. 1.

In some example embodiments, the method 500 may further comprise: obtaining a power profile of the at least one signal, the power profile comprising power profile parts in a first quiet period, an active period, and a second quiet period; and determining the number of attackers based on the power profile.

In some example embodiments, the method 500 may further comprise: in accordance with a determination that the power profile part in the active period is above a first threshold and flat, and the power profile parts in the first and second quiet periods are below a second threshold, determining the number of attackers to be zero. It is to be understood that as in real life operations a power profile might not be completely flat due to the fact that devices may not operate in an ideal manner. Hence, herein, reference to flat power profile part in the active period may refer to a power profile part that is substantially flat or approximately flat.

In some example embodiments, the method 500 may further comprise: in accordance with a determination that there is a step in the power profile part in the active period, incrementing the count of the number of attackers.

In some example embodiments, the power profile part in the first quiet period may be below a second threshold, and the power profile part in the second quiet period is above the second threshold.

In some example embodiments, the method 500 may further comprise: in accordance with a determination that a difference between a first power level of a first bin and a second power level of a second bin is larger than a third threshold, determining that there is the step in the power profile part in the active period, the first bin and the second bin being consecutive bins.

In some example embodiments, the attacker information may further comprise a size of at least one step in the power profile part in the active period.

In some example embodiments, the method 500 may further comprise: obtaining a channel profile of the at least one signal, the channel profile at least comprising channel profile parts in a plurality of bins of an active period; determining sparsity metrics for the plurality of bins based on the channel profile parts; and determining the number of attackers based on the sparsity metrics.

In some example embodiments, the method 500 may further comprise: comparing sparsity metrics of the plurality of bins with a reference sparsity metric of a reference bin affected by the trick tag signal; and in accordance with a determination that all of the sparsity metrics are the same as the reference sparsity metric, determining the number of attackers to be zero.

In some example embodiments, the method 500 may further comprise: comparing a first sparsity metric of a first bin in the plurality of bins with a reference sparsity metric of a reference bin affected by the trick tag signal; and in accordance with a determination that the first sparsity metric is different from the reference sparsity metric, incrementing the count corresponding to the number of attackers.

In some example embodiments, the method 500 may further comprise: obtaining a power profile of the at least one signal, the power profile comprising power profile parts in a first quiet period, an active period, and a second quiet period; obtaining a channel profile of the at least one signal, the channel profile at least comprising channel profile parts in a plurality of bins of the active period; and determining the number of attackers based on the power profile and the channel profile.

In some example embodiments, the method 500 may further comprise: in accordance with a determination that the power profile part in the active period is above a first threshold and flat (or substantially flat), and the power profile parts in the first and second quiet periods are below a second threshold, comparing sparsity metrics of the plurality of bins with a reference sparsity metric of a reference bin affected by the trick tag signal; and in accordance with a determination that all the sparsity metrics are the same as the reference sparsity metric, determining the number of attackers to be zero.

In some example embodiments, the method 500 may further comprise: in accordance with a determination that there is a step in the power profile part in the active period, comparing a sparsity metric of a third bin associated with the step in the plurality of bins with a reference sparsity metric of a reference bin affected by the trick tag signal; and in accordance with a determination that the sparsity metric of the third bin is different from the reference sparsity metric, incrementing the count of the number of attackers.

In some example embodiments, the at least one signal may comprise a plurality of signals, and each of the plurality of the signals is received through a respective one of a plurality of antennas of the apparatus.

In some example embodiments, the method 500 may further comprise: receiving, from the network device, a configuration indicative of a first quiet period, an active period, and a second quiet period of the trick tag signal.

In some example embodiments, the apparatus may be a further terminal device or a further network device.

Figure 6:
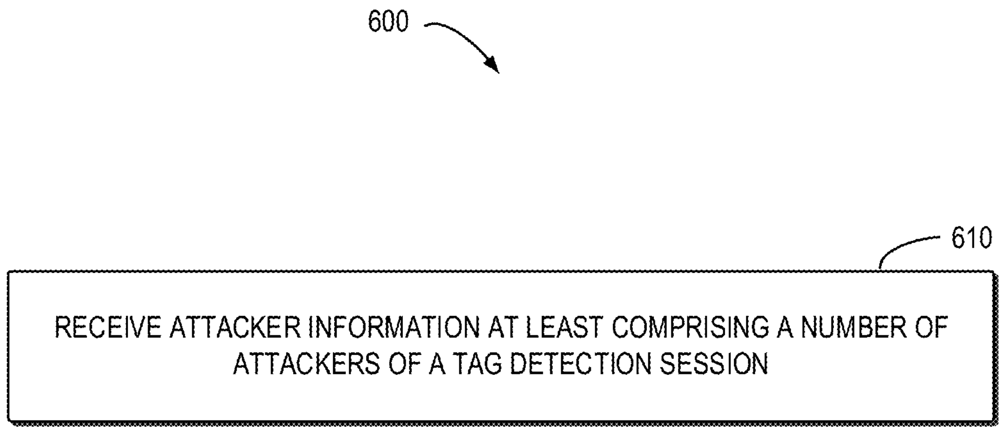
FIG. 6 illustrates a flowchart of a method implemented at an apparatus according to some example embodiments of the present disclosure.

FIG. 6 shows a flowchart of an example method 600 implemented at an apparatus in accordance with some example embodiments of the present disclosure. For example, the apparatus may be a network device, such as, a gNB. For the purpose of discussion, the method 600 will be described from the perspective of the network device 120 in FIG. 1.

At block 610, the apparatus receives, from a device, attacker information at least comprising a number of attackers of a tag detection session. The number of attackers is determined based on at least one signal received at the device, and the at least one signal is at least associated with a trick tag signal transmitted from a terminal device.

In some example embodiments, the attacker information may further comprise a size of at least one step in a power profile part in an active period, and the power profile part is a part of a power profile of the at least one signal.

In some example embodiments, the method 600 may further comprise: transmitting, to the device, a configuration indicative of a first quiet period, an active period, and a second quiet period of the trick tag signal.

In some example embodiments, the apparatus may be a network device, and the device may be a further terminal device or a further network device.

In some example embodiments, an apparatus, which is also referred to as a first apparatus hereafter, capable of performing any of the method 500 (for example, the reader device 110 in FIG. 1) may comprise means for performing the respective operations of the method 500. The means may be implemented in any suitable form. For example, the means may be implemented in a circuitry or software module. The first apparatus may be implemented as or included in the reader device 110 in FIG. 1.

In some example embodiments, the first apparatus comprises means for receiving at least one signal which is at least associated with a trick tag signal transmitted from a terminal device; means for determining a number of attackers of a tag detection session based on the at least one signal; and means for transmitting, to a network device, attacker information at least comprising the number of attackers.

In some example embodiments, the first apparatus further comprises: means for obtaining a power profile of the at least one signal, the power profile comprising power profile parts in a first quiet period, an active period, and a second quiet period; and means for determining the number of attackers based on the power profile.

In some example embodiments, the first apparatus further comprises: means for in accordance with a determination that the power profile part in the active period is above a first threshold and flat (or substantially flat), and the power profile parts in the first and second quiet periods are below a second threshold, determining the number of attackers to be zero.

In some example embodiments, the first apparatus further comprises: means for in accordance with a determination that there is a step in the power profile part in the active period, incrementing the count of the number of attackers.

In some example embodiments, the power profile part in the first quiet period is below a second threshold, and the power profile part in the second quiet period is above the second threshold.

In some example embodiments, the first apparatus further comprises: means for in accordance with a determination that a difference between a first power level of a first bin and a second power level of a second bin is larger than a third threshold, determining that there is the step in the power profile part in the active period, the first bin and the second bin being consecutive bins.

In some example embodiments, the attacker information further comprises a size of at least one step in the power profile part in the active period.

In some example embodiments, the first apparatus further comprises: means for obtaining a channel profile of the at least one signal, the channel profile at least comprising channel profile parts in a plurality of bins of an active period; means for determining sparsity metrics for the plurality of bins based on the channel profile parts; and means for determining the number of attackers based on the sparsity metrics.

In some example embodiments, the first apparatus further comprises: means for comparing sparsity metrics of the plurality of bins with a reference sparsity metric of a reference bin affected by the trick tag signal; and means for in accordance with a determination that all of the sparsity metrics are the same as the reference sparsity metric, determining the number of attackers to be zero.

In some example embodiments, the first apparatus further comprises: means for comparing a first sparsity metric of a first bin in the plurality of bins with a reference sparsity metric of a reference bin affected by the trick tag signal; and means for in accordance with a determination that the first sparsity metric is different from the reference sparsity metric, incrementing the count of the number of attackers.

In some example embodiments, the first apparatus further comprises: means for obtaining a power profile of the at least one signal, the power profile comprising power profile parts in a first quiet period, an active period, and a second quiet period; means for obtaining a channel profile of the at least one signal, the channel profile at least comprising channel profile parts in a plurality of bins of the active period; and means for determining the number of attackers based on the power profile and the channel profile.

In some example embodiments, the first apparatus further comprises: means for in accordance with a determination that the power profile part in the active period is above a first threshold and flat (or substantially flat), and the power profile parts in the first and second quiet periods are below a second threshold, comparing sparsity metrics of the plurality of bins with a reference sparsity metric of a reference bin affected by the trick tag signal; and means for in accordance with a determination that all the sparsity metrics are the same as the reference sparsity metric, determining the number of attackers to be zero.

In some example embodiments, the first apparatus further comprises: means for in accordance with a determination that there is a step in the power profile part in the active period, comparing a sparsity metric of a third bin associated with the step in the plurality of bins with a reference sparsity metric of a reference bin affected by the trick tag signal; and means for in accordance with a determination that the sparsity metric of the third bin is different from the reference sparsity metric, incrementing the count of the number of attackers.

In some example embodiments, the at least one signal comprises a plurality of signals, and each of the plurality of the signals is received through a respective one of a plurality of antennas of the apparatus.

In some example embodiments, the first apparatus further comprises: means for receiving, from the network device, a configuration indicative of a first quiet period, an active period, and a second quiet period of the trick tag signal.

In some example embodiments, the first apparatus is a further terminal device or a further network device.

In some example embodiments, the first apparatus further comprises means for performing other operations as described in the example embodiments of the method 500 or the reader device 110. In some example embodiments, the means comprises at least one processor; and at least one memory storing instructions that, when executed by the at least one processor, cause the performance of the first apparatus as disclosed herein.

In some example embodiments, an apparatus, also referred to as a second apparatus, capable of performing any of the method 600 (for example, the network device 120 in FIG. 1) may comprise means for performing the respective operations of the method 600. The means may be implemented in any suitable form. For example, the means may be implemented in a circuitry or software module. The second apparatus may be implemented as or included in the network device 120 in FIG. 1.

In some example embodiments, the second apparatus comprises means for receiving, from a device, attacker information at least comprising a number of attackers of a tag detection session, wherein the number of attackers is determined based on at least one signal received at the device, and the at least one signal is at least associated with a trick tag signal transmitted from a terminal device.

In some example embodiments, the attacker information further comprises a size of at least one step in a power profile part in an active period, and the power profile part is a part of a power profile of the at least one signal.

In some example embodiments, the second apparatus further comprises: means for transmitting, to the device, a configuration indicative of a first quiet period, an active period, and a second quiet period of the trick tag signal.

In some example embodiments, the second apparatus is a network device, and the device is a further terminal device or a further network device.

In some example embodiments, the second apparatus further comprises means for performing other operations as described in some example embodiments of the method 600 or the network device 120. In some example embodiments, the means comprises at least one processor; and at least one memory storing instructions that, when executed by the at least one processor, cause the performance of the second apparatus.

Figure 7:
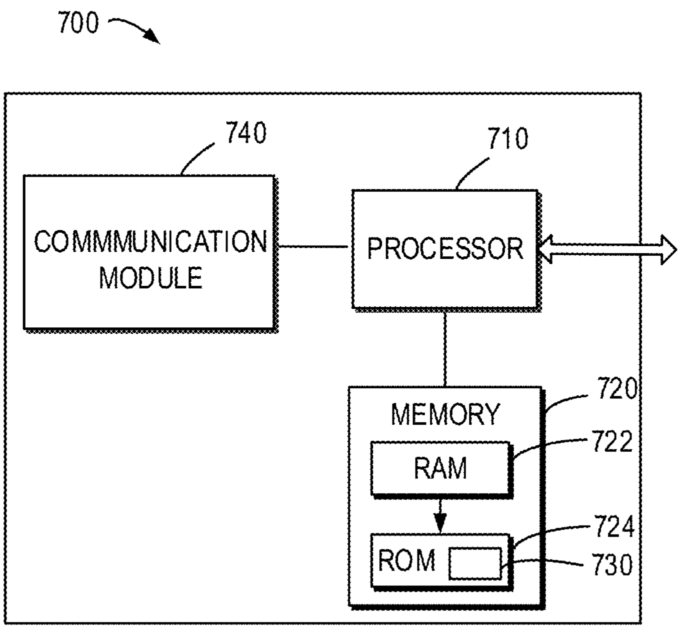
FIG. 7 illustrates a simplified block diagram of a device that is suitable for implementing example embodiments of the present disclosure.

FIG. 7 is a simplified block diagram of a device 700 that is suitable for implementing example embodiments of the present disclosure. The device 700 may be provided to implement a communication device, for example, the reader device 110, the TT device 112, or the network device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
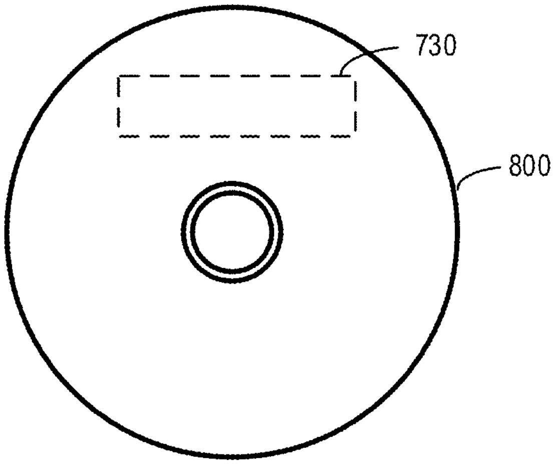
FIG. 8 illustrates a block diagram of an example computer readable medium in accordance with some example embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:

at least one processor; and at least one memory storing instructions that, when executed by the at least one processor, cause the apparatus at least to:

receive at least one signal which is at least associated with a trick tag signal transmitted from a terminal device;

obtain a channel profile of the at least one signal, the channel profile at least including channel profile parts in a plurality of bins of an active period;

determine a number of attackers of a tag detection session based on the channel profile; and transmit, to a network device, attacker information at least including the number of attackers.

2. The apparatus of claim 1, wherein the apparatus is further configured to:

obtain a power profile of the at least one signal, the power profile including power profile parts in a first quiet period, the active period, and a second quiet period; and determine the number of attackers based on the power profile.

3. The apparatus of claim 2, wherein the apparatus is further configured to:

in accordance with a determination that a power profile part in the active period is above a first threshold and substantially flat, and the power profile parts in the first quiet period and the second quiet period are below a second threshold, determine the number of attackers to be zero.

4. The apparatus of claim 2, wherein the apparatus is further configured to:

in accordance with a determination that there is a step in a power profile part in the active period, increment a count of the number of attackers.

5. The apparatus of claim 4, wherein the power profile in the active period comprises power levels in the plurality of bins of an active the active period, and the apparatus is further configured to:

in accordance with a determination that a difference between a first power level of a first bin and a second power level of a second bin is larger than a third threshold, determine that there is the step in the power profile part in the active period, the first bin and the second bin being consecutive bins.

6. The apparatus of claim 4, wherein the attacker information further comprises a size of at least one step in the power profile part in the active period.

7. The apparatus of claim 2, wherein a power profile part in the first quiet period is below a second threshold, and the power profile part in the second quiet period is above the second threshold.

8. The apparatus of claim 1, wherein the apparatus is further configured to:

determine sparsity metrics for the plurality of bins based on the channel profile parts; and determine the number of attackers based on the sparsity metrics.

9. The apparatus of claim 8, wherein the apparatus is further configured to:

compare the sparsity metrics for the plurality of bins with a reference sparsity metric of a reference bin affected by the trick tag signal; and in accordance with a determination that all of the sparsity metrics are the same as the reference sparsity metric, determine the number of attackers to be zero.

10. The apparatus of claim 8, wherein the apparatus is further configured to:

compare a first sparsity metric of a first bin in the plurality of bins with a reference sparsity metric of a reference bin affected by the trick tag signal; and in accordance with a determination that the first sparsity metric is different from the reference sparsity metric, increment a count of the number of attackers.

11. The apparatus of claim 1, wherein the apparatus is further configured to:

obtain a power profile of the at least one signal, the power profile comprising power profile parts in a first quiet period, the active period, and a second quiet period;

determine the number of attackers based on the power profile and the channel profile.

12. The apparatus of claim 11, wherein the apparatus is further configured to:

in accordance with a determination that a power profile part in the active period is above a first threshold and substantially flat, and the power profile parts in the first quiet period and the second quiet period are below a second threshold, compare sparsity metrics of the plurality of bins with a reference sparsity metric of a reference bin affected by the trick tag signal; and in accordance with a determination that all the sparsity metrics are the same as the reference sparsity metric, determine the number of attackers to be zero.

13. The apparatus of claim 11, wherein the apparatus is further configured to:

in accordance with a determination that there is a step in a power profile part in the active period, compare a sparsity metric of a third bin associated with the step in the plurality of bins with a reference sparsity metric of a reference bin affected by the trick tag signal; and in accordance with a determination that the sparsity metric of the third bin is different from the reference sparsity metric, increment a count of the number of attackers.

14. The apparatus of claim 1, wherein the at least one signal comprises a plurality of signals, and each of the plurality of signals is received through a respective one of a plurality of antennas of the apparatus.

15. The apparatus of claim 1, wherein the apparatus is further configured to: receive, from the network device, a configuration indicative of a first quiet period, the active period, and a second quiet period of the trick tag signal.

16. The apparatus of claim 1, wherein the apparatus is a further terminal device or a further network device.

17. An apparatus comprising:

at least one processor; and at least one memory storing instructions that, when executed by the at least one processor, cause the apparatus at least to:

receive, from a device, attacker information at least including a number of attackers of a tag detection session, wherein the number of attackers is determined based on a channel profile of at least one signal received at the device, the channel profile at least including channel profile parts in a plurality of bins of an active period, and the at least one signal is at least associated with a trick tag signal transmitted from a terminal device.

18. The apparatus of claim 17, wherein the attacker information further comprises a size of at least one step in a power profile part in the active period, and the power profile part is a part of a power profile of the at least one signal.

19. The apparatus of claim 17, wherein the apparatus is further configured to:

transmit, to the device, a configuration indicative of a first quiet period, the active period, and a second quiet period of the trick tag signal.

20. The apparatus of claim 17, wherein the apparatus is a network device, and the device is a further terminal device or a further network device.

21. A method comprising:

receiving at least one signal which is at least associated with a trick tag signal transmitted from a terminal device;

determining a number of attackers of a tag detection session based on a channel profile of the at least one signal, the channel profile at least including channel profile parts in a plurality of bins of an active period; and transmitting, to a network device, attacker information at least including the number of attackers.

* * * * *